United States Patent
D'Abreu et al.

(10) Patent No.: US 8,418,026 B2
(45) Date of Patent: Apr. 9, 2013

(54) HYBRID ERROR CORRECTION CODING TO ADDRESS UNCORRECTABLE ERRORS

(75) Inventors: Manuel Antonio D'Abreu, El Dorado Hills, CA (US); Stephen Skala, Fremont, CA (US)

(73) Assignee: Sandisk Technologies Inc., Plano, TX (US)

( * ) Notice: Subject to any disclaimer, the term of this patent is extended or adjusted under 35 U.S.C. 154(b) by 356 days.

(21) Appl. No.: 12/913,120

(22) Filed: Oct. 27, 2010

(65) Prior Publication Data

US 2012/0110417 A1 May 3, 2012

(51) Int. Cl.
*H03M 13/00* (2006.01)

(52) U.S. Cl. .......................... 714/758; 714/752

(58) Field of Classification Search .............. 714/752, 714/758, 779
See application file for complete search history.

(56) References Cited

U.S. PATENT DOCUMENTS

| | | | |
|---|---|---|---|
| 5,610,929 A * | 3/1997 | Yamamoto | 714/785 |
| 6,304,992 B1 * | 10/2001 | Cypher | 714/757 |
| 6,651,212 B1 | 11/2003 | Katayama et al. | |
| 7,171,591 B2 | 1/2007 | Chen | |
| 7,173,852 B2 | 2/2007 | Gorobets et al. | |
| 7,350,133 B2 * | 3/2008 | Kim et al. | 714/762 |
| 2007/0157064 A1 * | 7/2007 | Falik et al. | 714/755 |
| 2007/0283224 A1 * | 12/2007 | Kirschner et al. | 714/768 |
| 2008/0168319 A1 | 7/2008 | Lee et al. | |
| 2009/0013233 A1 | 1/2009 | Radke | |
| 2009/0183052 A1 * | 7/2009 | Kanno et al. | 714/763 |
| 2009/0292970 A1 | 11/2009 | Man et al. | |
| 2012/0023384 A1 * | 1/2012 | Naradasi et al. | 714/763 |
| 2012/0204077 A1 * | 8/2012 | D'Abreu et al. | 714/755 |

FOREIGN PATENT DOCUMENTS

| | | |
|---|---|---|
| EP | 1857939 A2 | 11/2007 |
| WO | 2009028281 A1 | 3/2009 |

OTHER PUBLICATIONS

International Search Report and Written Opinion for International Application No. PCT/US2011/055739 mailed Jan. 19, 2012, 10 pages.

\* cited by examiner

*Primary Examiner* — Joshua Lohn
(74) *Attorney, Agent, or Firm* — Toler Law Group, PC

(57) ABSTRACT

A method in a memory device includes receiving data including a data block and main error correction coding (ECC) data for the data block. The data block includes a first sub-block of data and first ECC data corresponding to the first sub-block. An ECC operation is initiated to process the data block using the main ECC data. In response to the ECC operation indicating uncorrectable errors in the data, a first sub-block ECC operation is initiated to process the first sub-block of data using the first ECC data.

29 Claims, 5 Drawing Sheets ure correction coding (ECC) decoder 142 and a sub-block ECC decoder 140 is depicted and generally designated 100. The system 100 includes a data storage device 102 that is configured to be operatively coupled to a host device 104 and that includes an ECC engine 114. When a data block is not decodable by the data block ECC decoder 142, the ECC engine 114 may selectively process one or more sub-blocks of the data block at the sub-block ECC decoder 140. By selectively processing one or more sub-blocks at the sub-block ECC decoder 140, enough errors may be corrected in the data block to enable the data block ECC decoder 142 to successfully decode the data block.

HYBRID ERROR CORRECTION CODING TO ADDRESS UNCORRECTABLE ERRORS

FIELD OF THE DISCLOSURE

The present disclosure is generally related to error correction.

BACKGROUND

The capability to store data in memory devices continually improves with advances in technology. For example, flash memory enables non-volatile storage of data with a storage density that can be enhanced by storing multiple data bits per memory cell. However, data written to a memory may be unintentionally altered due to physical conditions that affect the memory, such as thermal noise, cosmic rays, or damage to physical components of the memory. Error correction coding (ECC) schemes are often used to correct errors that may occur in data. Such ECC schemes typically include encoding the data using redundant information, providing recovery from errors but also increasing manufacturing cost and reducing data storage density of the memory device. Improvements to an error correction capability of memory devices may enable enhanced operation or reduced cost of such devices.

SUMMARY

A hybrid ECC system to address uncorrectable errors includes an ECC word that has a data block and main ECC data for the data block. The data block includes at least one sub-block and sub-block ECC data for the sub-block. If the ECC word is uncorrectable using the main ECC data due to too many errors occurring in the ECC word, error correction processing is performed for one or more of the sub-blocks using the sub-block ECC data.

Individual sub-blocks may have a lower error density than the ECC word and may be correctable using the sub-block ECC data. In some cases, all errors occurring in the data block may be corrected using the sub-block ECC data to process the sub-blocks of the data block. In other cases, a sufficient number of errors may be corrected during the sub-block processing to render the ECC word correctable using the main ECC data.

DETAILED DESCRIPTION

Figure 1:
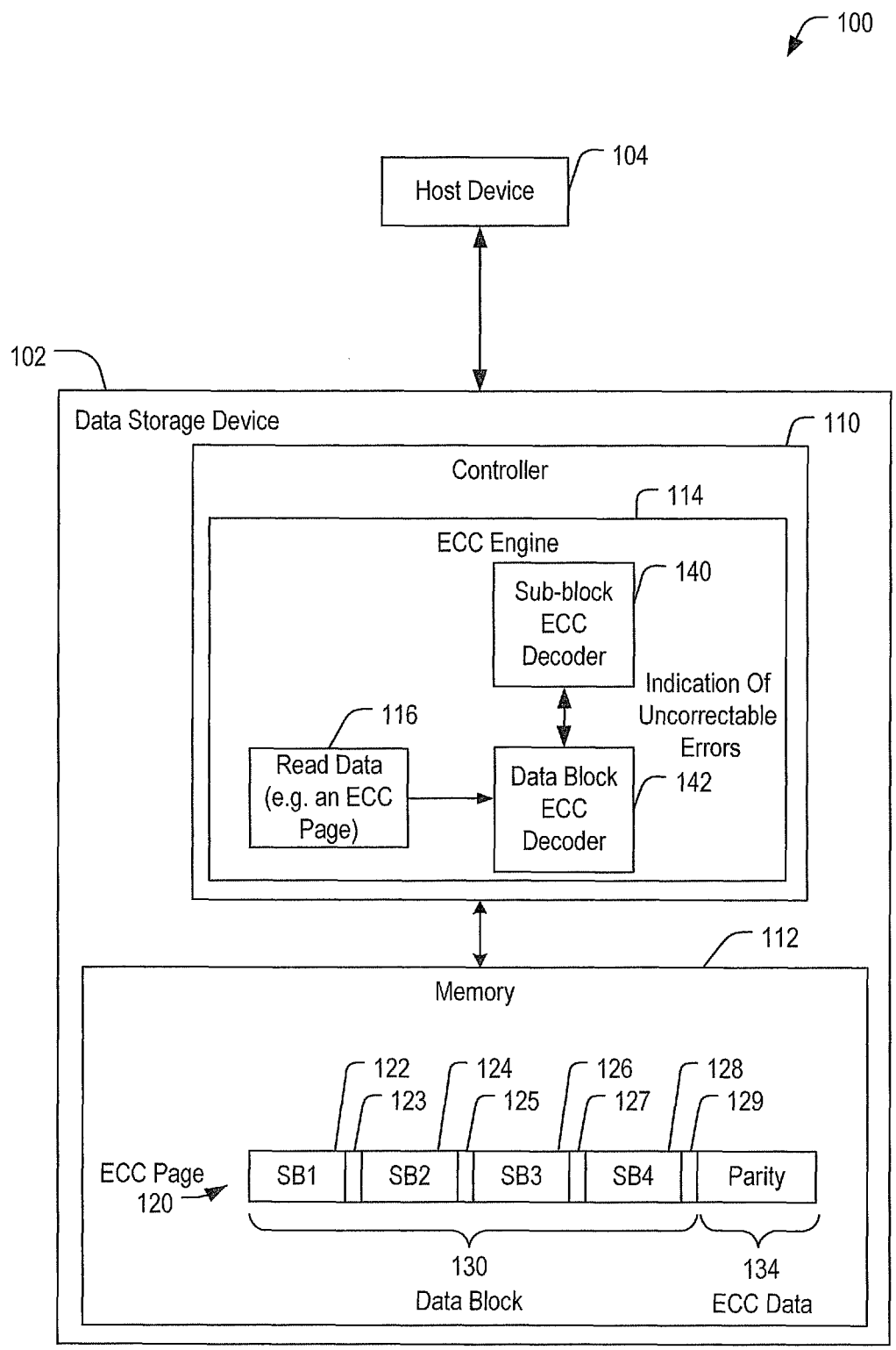
FIG. 1 is a block diagram of a particular illustrative embodiment of a system to perform incremental hybrid ECC processing.

Referring to FIG. 1, an illustrative embodiment of a system including a data block error correction coding (ECC) decoder The host device 104 is configured to send memory access requests to the data storage device 102 to read or write data to the memory 112. For example, the host device 104 may include a mobile telephone, a music or video player, a gaming console, an electronic book reader, a personal digital assistant (PDA), a computer such as a laptop computer or notebook computer, any other electronic device, or any combination thereof.

The data storage device 102 includes a controller 110 coupled to a memory 112. The controller 110 includes the ECC engine 114. The controller 110 is configured to perform communication operations, such as sending instructions and data to the host device 104 and receiving instructions and data from the host device 104. The controller 110 is also configured to perform memory operations, such as encoding and sending data to the memory 112 for storage and retrieving and decoding data from the memory 112.

The memory 112 may include a non-volatile memory, such as a flash memory. For example, the data storage device 102 may be a flash memory card, a universal serial bus (USB) flash drive, a solid state drive (SSD), or an embedded flash memory. Alternatively, the memory 112 may not include a flash memory. For example, the memory 112 may include a hard disk drive with rotating platters or an optical storage device, as illustrative examples.

The data storage device 102 may be configured to be removably coupled to the host device 104. For example, the data storage device 102 may be a removable flash drive or a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). Alternatively, the data storage device 102 may be coupled to the host device 104 as an embedded memory, such as eMMC® (trademark of JEDEC Solid State Technology Association, Arlington, Va.) and eSD, as illustrative examples. For example, the data storage device 102 may be embedded within the host device 104 and may be integrated within the host device 104, such as within a common casing of the host device 104.

The ECC engine 114 is configured to process data retrieved from the memory 112. For example, the memory 112 is illustrated as including a representative data word, illustrated as an ECC page 120. The ECC page 120 includes a data block 130 and main ECC data 134. For example, the main ECC data 134 may include parity bits representing ECC redundancy data to enable the ECC engine 114 to detect and correct one or more errors that may occur within the data block 130 and/or within the main ECC data 134. The ECC page 120 also includes multiple sub-blocks within the data block 130, such as a first sub-block SB1 122 and first ECC data 123 corresponding to the first sub-block 122. The ECC page 120 also includes a second sub-block SB2 124 and second ECC data 125 corresponding to the second sub-block 124. The ECC page 120 further includes a third sub-block SB3 126, a fourth sub-block SB4 128, and third and fourth ECC data 127 and 129 corresponding to the third and fourth sub-blocks 126 and 128, respectively. Each sub-block 122, 124, 126, 128 may include user data and the sub-block ECC data 123, 125, 127, 129 includes redundancy data, such as parity bits for its respective sub-block. The parity bits may enable detection and correction of one or more errors occurring within the sub-block but with a lower strength (i.e. capable of correcting fewer errors) than the main ECC data 134 for the ECC page 120.

The ECC engine 114 is configured to receive and process data 116 that has been obtained from the memory 112 and provided to the ECC engine 114. For example, the read data 116 may be the ECC page 120 that has been encoded according to a Reed-Solomon ("RS") ECC encoding scheme or a Bose-Chaudhuri-Hocquenghem ("BCH") encoding scheme, as illustrative, non-limiting examples. The ECC engine 114 is configured to provide the data 116 to the data block ECC decoder 142 for decoding by detecting and correcting one or more errors according to the ECC scheme (e.g. a RS or BCH scheme).

The sub-block ECC decoder 140 is configured to process one or more sub-blocks 122, 124, 126, 128 of the data block 130 and the sub-block ECC data 123, 125, 127, 129 corresponding to the one or more sub-blocks. For example, the sub-block ECC decoder 140 is capable of decoding the first sub-block SB 1 122 and the first ECC data 123 corresponding to the first sub-block 122. To illustrate, the first sub-block 122 may have been encoded using a RS or BCH encoding scheme to generate parity bits as the first ECC data 123. The sub-block ECC decoder 140 may be operative to detect or correct one or more errors occurring in the first sub-block 122 and the first ECC data 123, up to a threshold number of errors.

The ECC engine 114 is configured to provide the data 116 to the data block ECC decoder 142 and to initiate processing of the data 116 at the data block ECC decoder 142. The ECC engine 114 is also configured, in response to the data block ECC decoder 142 indicating detection of uncorrectable errors in the data 116, to initiate processing at the sub-block ECC decoder 140. For example, the ECC engine 114 may provide the first sub-block SB1 122 and the first ECC data 123 to the sub-block ECC decoder 140 to process the first sub-block SB1 122 using the first ECC data 123. The ECC engine 114 may further be configured to process the second sub-block SB2 124 using the second ECC data 125, the third sub-block SB3 126 using the third ECC data 127, the fourth sub-block SB4 128 using the fourth ECC data 129, or any combination thereof.

The controller 110 may be configured to determine a first number of errors in the data 116 processed by the data block ECC decoder 142 and to compare the first number of errors to a second number of errors that are corrected by the sub-block ECC decoder 140 after processing the first sub-block 122. For example, the sub-block ECC decoder 140 may correct errors while processing of the first sub-block 122 that were not correctable by the data block ECC decoder 142. Errors corrected at the sub-block ECC decoder 140 are applied to the data 116 and reduce an overall number of errors in the data 116. After correction of a sufficient number of errors by the sub-block ECC decoder 140, a total number of remaining errors in the data 116 may fall within a correctable number of errors for the data block ECC decoder 142. As a result, the partially corrected data 116 may be decoded by the data block ECC decoder 142 using the main ECC data 134.

Thus, when the FCC page 120 includes a number of errors that exceeds an ECC error threshold for the data block ECC decoder 142, one or more of the sub-blocks 122, 124, 126, 128 may be correctable at the sub-block ECC decoder 140. For example, a sub-block may be encoded using a similar ECC scheme as the data block to generate sub-block FCC data corresponding to the sub-block. However, errors occurring at an individual sub-block may have a lower density (e.g. fewer errors per bit) than errors occurring at the overall the data block. As a result, the relatively fewer errors occurring at the sub-block (and corresponding sub-block ECC data) may be correctable during sub-block ECC processing. As another example, a sub-block may use an ECC scheme that provides a different performance than the data block ECC scheme for certain types of errors characteristics (e.g. distributed vs. clustered error distribution).

By encoding one or more individual sub-blocks within the ECC page 120 using a lower-power secondary ECC encoding, and encoding the sub-blocks and sub-block ECC data combined into the data block 130 using a main ECC encoding scheme, sub-blocks of the data block 130 may be correctable using the sub-block ECC data although the ECC page 120 is not correctable using the main ECC data 134. As a result, after a sufficient number of errors have been corrected in the individual sub-blocks 122, 124, 126, 128, a partially error corrected version of the ECC page 120 with one or more corrected sub-blocks/sub-block ECC data 122-129 may be provided to the data block ECC decoder 142 to enable correction of the entire ECC page 120.

Therefore, the data storage device 102 can correct errors exceeding a correction capacity of the main ECC encoding scheme used to generate the main ECC data 134. In some implementations, a useful operating life of the data storage device 102 may be extended as a result of the ability to correct a greater number of errors, such as due to device wear. In other implementations, the sub-block ECC decoder 140 may be used to maintain an overall error correction capability of the data storage device 102 with a reduced strength data block ECC decoder 142, resulting in faster decoding, reduced power consumption, and decreased cost of the data block ECC decoder 142.

Additionally, sub-block encoding within the ECC page 120 may be selectively applied to data stored at the memory 112. For example, sub-block ECC encoding may be performed by the controller 110 prior to storing data at word lines, blocks, or other portions of the memory 112 that may be determined or expected to have an increased error rate but not prior to storing data at portions of the memory 112 that are not expected to have the increased error rate. As another example, sub-block ECC encoding may not be performed until the data storage device 102 approaches an end of its useful operating life, when errors due to device wear approach the correction capacity of the data block ECC decoder 142. As a result, a higher average storage density, faster average decoding time, reduced average power consumption, or any combination thereof, may be achieved.

Figure 2:
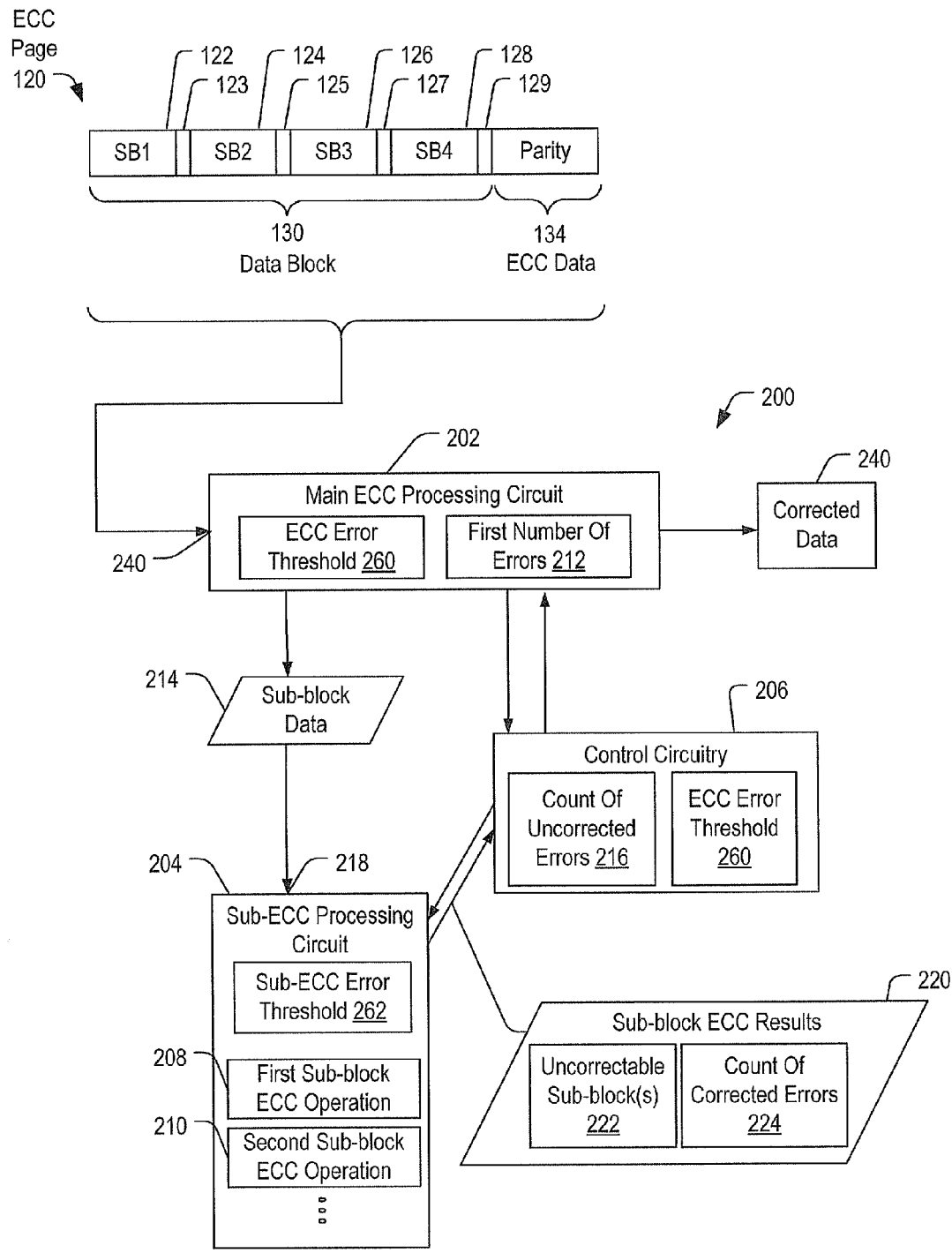
FIG. 2 is a block diagram of another illustrative embodiment of a system to perform incremental hybrid ECC processing.

Referring to FIG. 2, a second illustrative embodiment of a system to perform hybrid ECC to address uncorrectable errors is depicted and generally designated 200. The system 200 includes a main ECC processing circuit 202 coupled to a sub-ECC processing circuit 204. The main ECC processing circuit 202 and the sub-ECC processing circuit 204 are responsive to control circuitry 206. The control circuitry 206 is configured to determine whether processing of the ECC page 120 is successful at the main ECC processing circuit 202, and in response to the processing of the ECC page 120 not being successful, to initiate one or more sub-block ECC operations at the sub-ECC processing circuit 204. As an illustrative example, the system 200 may be incorporated within the controller 110 of FIG. 1. The main ECC processing circuit 202 may correspond to the data block ECC decoder 142 and the sub-ECC processing circuit 204 may correspond to the sub-block ECC decoder 140.

The main ECC processing circuit 202 is configured to process received data, such as the ECC page 120 retrieved from the memory 112 of FIG. 1. The main ECC processing circuit 202 is adapted to apply an FCC decoding scheme using the main ECC data 134 to determine a first number of errors 212 in the ECC page 120. The main ECC processing circuit 202 is configured to locate and correct the determined errors in response to the first number of errors 212 not exceeding an ECC error threshold 260, resulting in corrected data 240.

The sub-ECC processing circuit 204 is configured to process one or more sub-blocks of the received data block 130 and FCC data corresponding to the one or more sub-blocks. For example, the sub-ECC processing circuit 204 may be responsive to the control circuitry 206 to process one of the sub-blocks, such as by initiating and performing a first sub-block ECC operation 208 to process the first sub-block SB1 122 using the first ECC data 123. The sub-ECC processing circuit 204 may also be responsive to the control circuitry 206 to initiate and perform a second sub-block ECC operation 210 to process another sub-block, such as the second sub-block SB2 124 using the second ECC data 125. The sub-ECC processing circuit 204 may be responsive to the control circuitry 206 to perform additional sub-ECC processing operations for other sub-blocks of the ECC page 120.

The control circuitry 206 may be configured to maintain a count or number of uncorrected errors 216 of the received data. For example, the control circuitry 206 may receive from the main ECC processing circuit 202 an indication of a first number of errors 212 detected in the ECC page 120 that were not corrected by the main ECC processing circuit 202. The control circuitry 206 may assign the count of uncorrected errors 216 to be equal to the first number of errors 212 and may initiate processing of one or more of the sub-blocks 122, 124, 126, or 128 by providing sub-block data 214 to the sub-ECC processing circuit 204.

In response to processing a sub-block, such as at the first sub-block ECC operation 208, the control circuitry 206 may receive sub-block ECC results 220 from the sub-ECC processing circuit 204. The sub-block ECC results 220 may indicate whether the sub-block most recently processed was an uncorrectable sub-block 222 and may include a count of corrected errors 224 for the sub-block. For example, when the sub-block and the sub-block ECC data have more errors than a sub-ECC error threshold 262, the sub-block is determined to be uncorrectable by the sub-ECC processing circuit 204. Otherwise, the detected errors are indicated to the control circuitry 206 via the sub-block ECC results 220 and corrected in the ECC page 120. The control circuitry 206 may reduce the number of uncorrected errors 216 by the count of corrected errors 224 for the sub-block.

The control circuitry 206 may be configured to compare the count of uncorrected errors 216 remaining in the ECC page 120 to the ECC error threshold 260 after the sub-ECC processing circuit 204 performs the first sub-block ECC operation 208. In response to the number of uncorrected errors 216 exceeding the ECC error threshold 260, the control circuitry 206 may be configured to initiate the second sub-block ECC operation 210 at the sub-ECC processing circuit 204 to process a second sub-block using second ECC data. For example, after processing the first sub-block SB1 122, if the count of uncorrected errors 216 is greater than the ECC error threshold 260, the control circuitry 206 may send the second sub-block SB2 124 and the second ECC data 125 to be processed via the second sub-block ECC operation 210 at the sub-ECC processing circuit 204.

The control circuitry 206 may be configured to initiate a second data block ECC operation at the main ECC processing circuit 202 in response to the count of uncorrected errors 216 satisfying the ECC error threshold 260. As an example, when the count of uncorrected errors 216 is less than or equal to the ECC error threshold 260, the partially corrected ECC page 120 may be corrected at the main ECC processing circuit 202 using the main ECC data 134. Thus, the ECC page 120 including corrected sub-blocks from the sub-ECC processing circuit 204 may be processed by the main ECC processing circuit 202 to generate the corrected data 240.

Although the control circuitry 206 is illustrated as maintaining the count of uncorrected errors 216 that is decremented in response to the sub-block ECC results 220 indicating the counts of corrected errors 224, in another embodiment the control circuitry 206 may instead be configured to maintain a count of corrected errors and incrementing count of corrected errors for each sub-block error that is corrected by the sub-ECC processing circuit 204. The control circuitry 206 may be configured to compare the count of corrected errors to the first number of errors 212 in the data. In response to the first number of errors 212 exceeding the count of corrected errors, the control circuitry 206 may be configured to initiate a sequential sub-block ECC operation at the sub-ECC processing circuit 204.

During operation, the ECC page 120 may be received at the input 240 of the main ECC processing circuit 202, and the control circuitry 206 may send a control signal to cause the main ECC processing circuit 202 to initiate decode processing of the ECC page 120. In response to the main ECC processing circuit 202 successfully decoding the ECC page 120, the main ECC processing circuit 202 generates the corrected data 240. However, if the ECC page 120 has a first number of errors 212 that exceeds the ECC error threshold 260, the main ECC processing circuit 202 is incapable of decoding the ECC page 120.

The control circuitry 206 may instruct the main ECC processing circuit 202 to provide sub-block data 214 to an input 218 of the sub-ECC processing circuit 204 and may cause the sub-FCC processing circuit 204 to initiate the first sub-block ECC operation 208 via a control signal. For example, the first sub-block ECC operation 208 may correspond to processing of the first sub-block SB1 122 using the first ECC data 123. However, the first sub-block ECC operation 208 need not correspond to the sequentially first sub-block SB1 122, and may instead correspond to any of the sub-blocks within the ECC page 120.

After completing the first sub-block ECC operation 208 the control circuitry 206 may receive the sub-block ECC results 220 including the indication 222 of whether the sub-block was correctable and the count of corrected errors 224. In the event that one or more errors were correctable in the first processed sub-block, the control circuitry 206 may decrement the count of uncorrected errors 216 and compare resulting count of uncorrected errors 216 to the ECC error threshold 260. For example, if three errors were detected and corrected during the first sub-block ECC operation 208, the count of uncorrected errors 216 may be reduced from the first number of errors 212 to equal the first number of errors 212 minus three. When the resulting count of uncorrected errors is less than or equal to the ECC error threshold 260, the control circuitry 206 may cause the main ECC processing circuit 202 to initiate a second decode operation using the partially corrected ECC page 120 (e.g. having one or more of the sub-blocks and sub-ECC data corrected according to the first sub-block ECC operation 208). Alternatively, when the count of uncorrected errors 216 exceeds the ECC error threshold 260, the control circuitry 206 may cause additional sub-block data 214 to be provided to the sub-ECC processing circuit 204 to initiate a second or subsequent sub-block ECC operation.

In this manner, each sub-block of the data block 130 may be individually processed and correctable sub-blocks may be corrected, reducing an overall number of errors in the ECC page 120. The entire data block 130 may be processed by sequential sub-block ECC operations at the sub-ECC processing circuit 204, after which it may be determined whether the number of corrected errors renders the ECC page 120 decodable by the main ECC processing circuit 202. Alternatively, the control circuitry 206 may keep track of how many errors have been corrected and may initiate the second ECC processing operation at the main ECC processing circuit 202 as soon as a sufficient number of errors have been corrected to enable decoding at the main ECC processing circuit 202.

Although the ECC page 120 is illustrated as having four sub-blocks 122, 124, 126, 128, each of substantially equal size and having ECC data 123, 125, 127, 129 corresponding to each sub-block, in other embodiments the ECC page 120 may have fewer than four sub-blocks or more than four sub-blocks. Further, the sub-blocks may not have the same size as each other and may instead have differing sizes.

Figure 3:
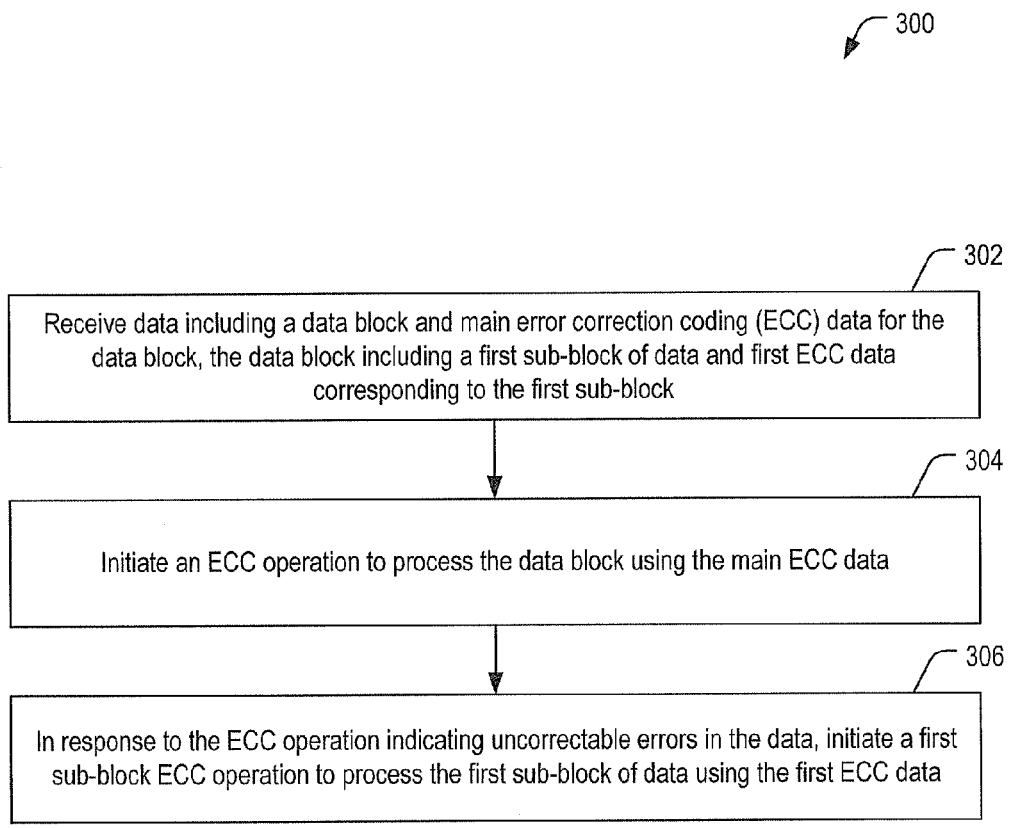
FIG. 3 is a flow diagram of a particular illustrative embodiment of a method of performing incremental hybrid ECC processing.

Referring to FIG. 3, a first illustrative embodiment of a method of hybrid ECC decoding is depicted and generally designated 300. The method 300 may be performed in a controller of a memory device, such as by the controller 110 of the data storage device 102 of FIG. 1.

The method 300 includes receiving data including a data block and main error correction coding (ECC) data for the data block, at 302. The data block includes a first sub-block of data and first ECC data corresponding to the first sub-block. For example, receiving the data may be performed by reading the data from a non-volatile memory of the memory device and sending the read data to an ECC engine of the controller. To illustrate, the data may be the ECC page 120 that is retrieved from the memory 112 and provided to the ECC engine 114 of FIG. 1.

An ECC operation is initiated to process the data block using the main ECC data, at 304. For example, initiating the ECC operation may be performed by providing the data to an input of a data block ECC decoder and instructing the data block ECC decoder to begin processing the data. To illustrate, the ECC page 120 may be provided to the input 240 of the main ECC processing circuit 202 of FIG. 2 and the control circuitry 206 may instruct the main ECC processing circuit 202 to begin processing the ECC page 120.

In response to the ECC operation indicating uncorrectable errors in the data, a first sub-block ECC operation is initiated to process the first sub-block of data using the first ECC data, at 306. For example, initiating the first sub-block ECC operation may be performed by providing at least a portion of the data to an input of a sub-block ECC decoder and instructing the sub-block ECC decoder to begin processing the provided portion of the data. To illustrate, the first sub-block SB1 122 and the first ECC data 123 may be provided as the sub-block data 214 to the input 218 of the sub-ECC processing circuit 204 of FIG. 2, and the control circuitry 206 may instruct the sub-ECC processing circuit 204 to initiate the first sub-block ECC operation 208 to begin processing the first sub-block SB1 122.

By processing a sub-block of the data block in response to the data block having an uncorrectable number of errors, errors within the sub-block may be corrected. As a result, the number of errors of the data block may be reduced to a number of errors that is correctable using the main ECC data. An operational life of the memory device may therefore be extended, as the device may continue to be used after errors occurring due to device wear exceed an error correction capability of the main ECC decoder.

Although FIG. 3 describes performing a single sub-block ECC operation, multiple sub-block ECC operations may be performed. For example, the data block may include a second sub-block and second ECC data corresponding to the second sub-block, such as the second sub-block SB2 124 and the second ECC data 125. A second sub-block ECC operation, such as the second sub-block ECC operation 210 of FIG. 2, may process the second sub-block using the second ECC data. Examples of incremental hybrid ECC methods using multiple sub-block ECC operations are described in FIGS. 4-5.

Figure 4:
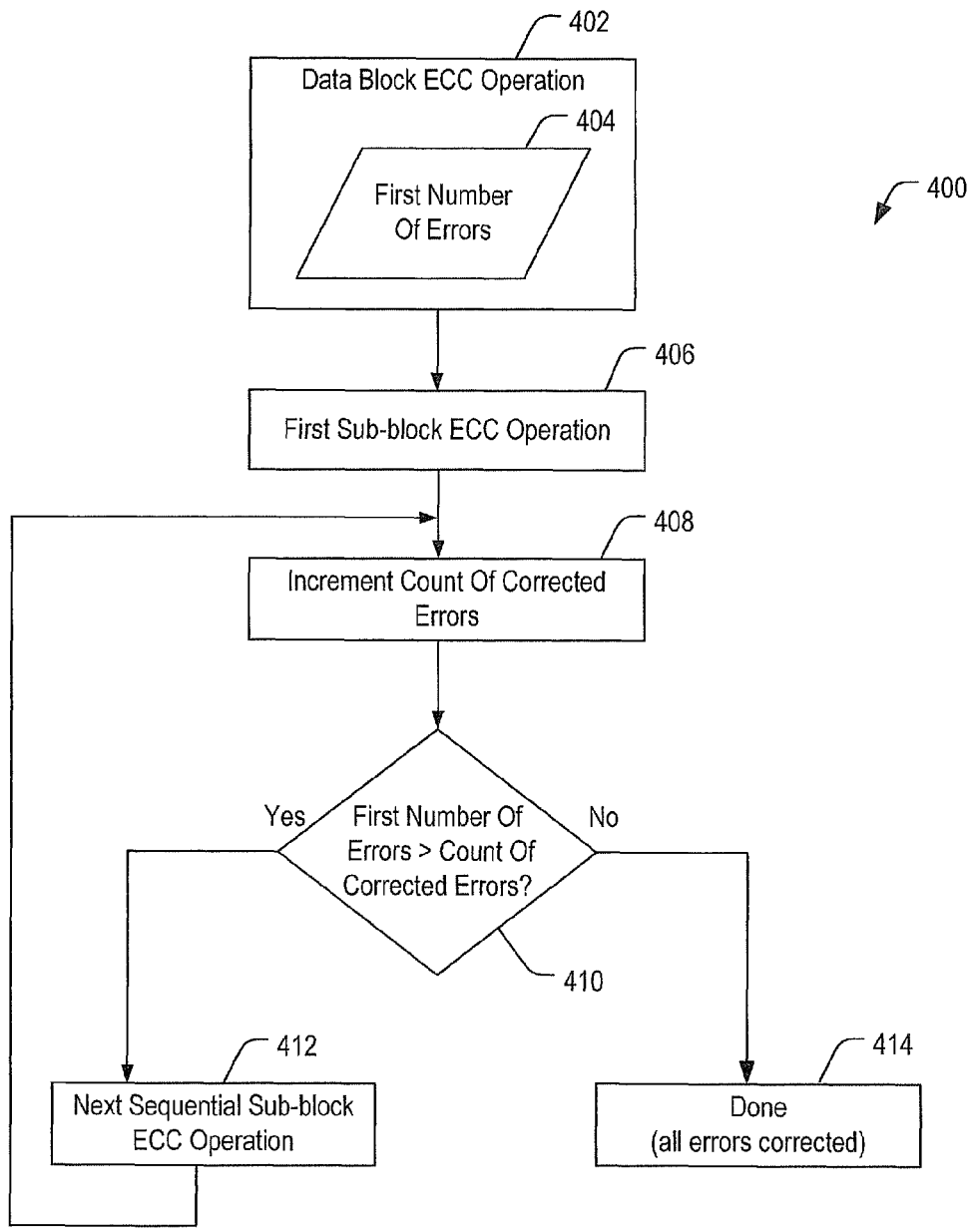
FIG. 4 is a flow diagram of another illustrative embodiment of a method of performing incremental hybrid ECC processing.

FIG. 4 illustrates an example of a method 400 of performing incremental hybrid ECC processing that addresses uncorrectable errors detected in received data during an ECC operation by sequentially processing sub-blocks while errors remain uncorrected in the data.

At 402, the method 400 includes performing a data block ECC operation on data including a data block and main ECC data, such as the data block 130 and the main ECC data 134 of the ECC page 120, at 402. The data block ECC operation determines a first number of errors 404 detected in the data that exceeds a correction capacity of the data block ECC operation.

A count of corrected errors may be initialized to zero and a first sub-block ECC operation may be initiated, at 406. For example, the first sub-block SB1 122 and the first ECC data 123 may be provided to the sub-block ECC decoder 140 of FIG. 1. The sub-block ECC decoder 140 may perform the first sub-block ECC operation and return results, such as the sub-block ECC results 220 of FIG. 2, indicating a second number of errors representing a count of errors corrected in the first sub-block.

A first iteration of a sub-block processing loop includes incrementing the count of corrected errors by the number of errors corrected in the first sub-block, at 408. For example, during the first iteration of the processing loop, the count of corrected errors may be incremented during the first sub-block ECC operation for each sub-block error that is corrected. As another example, the count of corrected errors may be incremented after the sub-block ECC operation to indicate a total number of sub-block errors that were corrected during the sub-block ECC operation.

A comparison of the first number of errors to the count of corrected errors is performed, at 410. In the first iteration of the processing loop, the count of corrected errors is equal to the second number of errors that are corrected by the first sub-block ECC operation.

In response to the first number of errors exceeding the count of corrected errors, a next sequential sub-block ECC operation (e.g. a second sub-block ECC operation) may be performed, at 412, and processing returns to 408 where the count of corrected errors is incremented in a next iteration of the processing loop. Alternatively, when no more sub-blocks of the data block remain to be processed, a second data block ECC operation may be initiated using the partially corrected data block and the main ECC data.

Otherwise, in response to the first number of errors equaling the count of corrected errors, at 410, all errors may have been corrected during the sub-block ECC operations and ECC processing may terminate, at 414.

Figure 5:
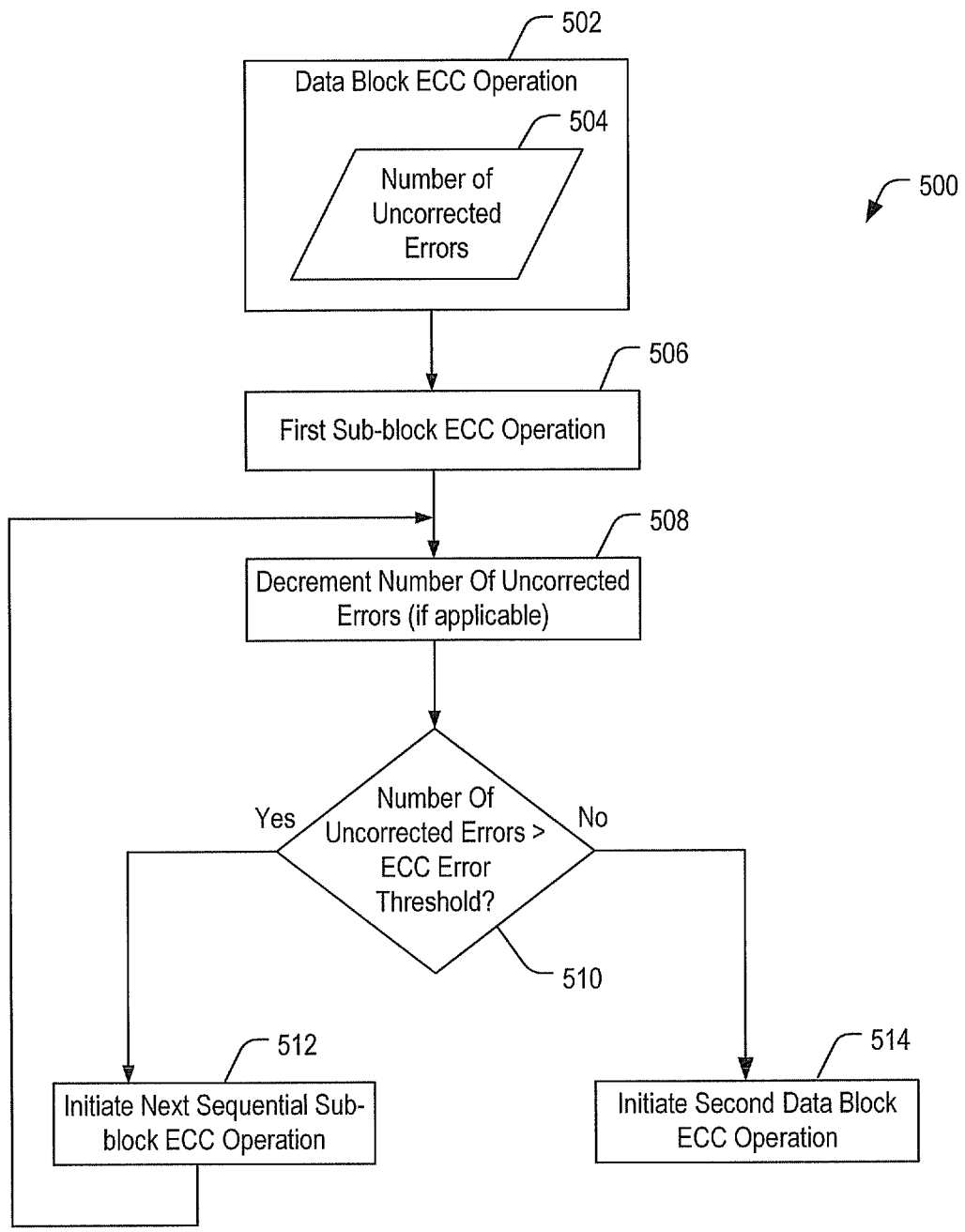
FIG. 5 is a flow diagram of another illustrative embodiment of a method of performing incremental hybrid ECC processing.

FIG. 5 illustrates an example of a method 500 of performing incremental hybrid ECC processing that addresses uncorrectable errors detected in received data during an ECC operation by sequentially processing sub-blocks until an ECC error threshold of the data block ECC decoder is satisfied.

At 502, the method 500 includes performing a data block ECC operation on data including a data block and main ECC data, such as the data block 130 and the main ECC data 134 of the ECC page 120. The ECC operation determines a number of uncorrected errors 504 detected in the data. When the number of uncorrected errors 504 is not zero, a correction capacity of the ECC operation has been exceeded and sub-block processing is performed to reduce the number of errors to a correctable amount.

A first sub-block ECC operation may be initiated, at 506. For example, the first sub-block SB1 122 and the first ECC data 123 may be provided to the sub-block ECC decoder 140 of FIG. 1. The sub-block ECC decoder 140 may perform the first sub-block ECC operation and return results, such as the sub-block ECC results 220 of FIG. 2, indicating a second number of errors that corresponds to a count of errors corrected in the first sub-block.

A first iteration of a sub-block processing loop includes decrementing the number of uncorrected corrected errors 504 by the number of errors (if any) corrected in the first sub-block ECC operation, at 508. In the first iteration of the processing loop, the method 500 includes comparing a number of uncorrected errors in the data to the ECC error threshold after the first sub-block ECC operation, at 510. For example, the ECC error threshold may indicate a largest number of errors that the data block ECC decoder 142 can correct within the ECC page 120.

In response to the number of uncorrected errors in the data exceeding the ECC error threshold, a next sequential sub-block ECC operation (e.g. a second sub-block ECC operation) is initiated to process a subsequent sub-block using corresponding ECC data, at 512, and processing returns to 508 where the number of uncorrected errors is decremented in a next iteration of the processing loop.

In response to the number of uncorrected errors in the data satisfying the ECC error threshold, at 510, a second data block ECC operation is initiated using the main FCC data, at 514. For example, once a sufficient number of errors in the sub-blocks and sub-block ECC data 122-129 have been corrected at the sub-block ECC decoder 140 of FIG. 1, sub-block processing may terminate (even if additional sub-block remain to be processed) and the partially corrected ECC page 120 may instead be processed at the data block ECC decoder 142.

Although various components depicted herein are illustrated as block components and described in general terms, such components may include one or more microprocessors, state machines, or other circuits configured to enable the data storage device 102 of FIG. 1 to perform the particular functions attributed to such components. For example, the ECC engine 114 of FIG. 1 may represent physical components, such as hardware controllers, state machines, logic circuits, or other structures, to enable the ECC engine 114 to selectively process at the sub-block ECC decoder 140 individual sub-blocks of data when the data is not correctable using the data block ECC decoder 142.

The ECC engine 114 may be implemented as dedicated hardware (i.e. circuitry) for reduced latency. Alternatively, the ECC engine 114 may be implemented using a microprocessor or microcontroller programmed to perform data block and sub-block processing. In a particular embodiment, the ECC engine 114 includes executable instructions that are executed by a processor and the instructions are stored at the memory 112. Alternatively, or in addition, executable instructions that are executed by a processor that may be included in the controller 110 may be stored at a separate memory location that is not part of the memory 112, such as at a read-only memory (ROM) (not shown).

In a particular embodiment, the data storage device 102 may be a portable device configured to be selectively coupled to one or more external devices. However, in other embodiments, the data storage device 102 may be attached or embedded within one or more host devices, such as within a housing of a portable communication device. For example, the data storage device 102 may be within a packaged apparatus such as a wireless telephone, personal digital assistant (PDA), gaming device or console, portable navigation device, or other device that uses internal non-volatile memory. In a particular embodiment, the data storage device 102 includes a non-volatile memory, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   in a controller of a memory device, performing:
   receiving data including a data block and main error correction coding (ECC) data for the data block, the data block including a first sub-block of data, first sub-block ECC data corresponding to the first sub-block, a second sub-block of data, and second sub-block ECC data corresponding to the second sub-block, wherein the first sub-block is a subset of the data block and the second sub-block is a different subset of the data block;
   initiating an ECC operation to process the data block using the main ECC data; and
   in response to the ECC operation indicating uncorrectable errors in the data, initiating a first sub-block ECC operation to process the first sub-block of data using the first sub-block ECC data.

2. The method of claim 1, wherein a second sub-block ECC operation processes the second sub-block using the second sub-block ECC data.

3. The method of claim 1, wherein the ECC operation determines a first number of errors in the data, and further comprising comparing the first number of errors to a second number of errors that are corrected by the first sub-block ECC operation.

4. The method of claim 3, further comprising, in response to the first number of errors exceeding the second number of errors, initiating a second data block ECC operation using the main ECC data.

5. The method of claim 3, further comprising, in response to the first number of errors exceeding the second number of errors, initiating a second sub-block ECC operation using the second sub-block ECC data.

6. The method of claim 1, wherein the data block includes multiple sub-blocks including the first sub-block and the second sub-block, and wherein a count of corrected errors is incremented during the first sub-block ECC operation for each sub-block error that is corrected.

7. The method of claim 6, further comprising:
comparing the count of corrected errors to a first number of errors in the data, wherein the first number of errors is determined by the ECC operation; and
in response to the first number of errors exceeding the count of corrected errors, initiating a next sequential sub-block ECC operation.

8. The method of claim 1, further comprising comparing a number of uncorrected errors in the data to an ECC error threshold after processing the first sub-block ECC operation.

9. The method of claim 8, further comprising, in response to the number of uncorrected errors in the data exceeding the ECC error threshold, initiating a second sub-block ECC operation to process the second sub-block using the second sub-block ECC data.

10. The method of claim 8, further comprising, in response to the number of uncorrected errors in the data satisfying the ECC error threshold, initiating a second ECC operation using the main ECC data.

11. The method of claim 1, wherein the memory device further comprises a non-volatile memory, and wherein receiving the data is performed by:
reading the data from the non-volatile memory; and
sending the read data to an ECC engine of the controller.

12. The method of claim 1, wherein:
initiating the ECC operation is performed by:
providing the data to an input of a data block ECC decoder; and
instructing the data block ECC decoder to begin processing the data; and
initiating the first sub-block ECC operation is performed by:
providing at least a portion of the data to an input of a sub-block ECC decoder; and
instructing the sub-block ECC decoder to begin processing the provided portion of the data.

13. A data storage device comprising:
a memory; and
a controller coupled to the memory, wherein the controller comprises an error correction coding (ECC) engine including:
a data block ECC decoder configured to process data retrieved from the memory, the data including a data block and main error correction coding (ECC) data for the data block; and
a sub-block ECC decoder configured to process sub-blocks of the data block and sub-block ECC data corresponding to the sub-blocks, wherein each sub-block is a sub-set of the data block,
wherein, in response to the data block ECC decoder indicating uncorrectable errors in the data, the ECC engine is configured to initiate processing at the sub-block ECC decoder to process a first sub-block using first sub-block ECC data corresponding to the first sub-block.

14. The data storage device of claim 13, wherein the data block includes a second sub-block and second sub-block ECC data corresponding to the second sub-block, and wherein the ECC engine is configured to process the second sub-block using the second sub-block ECC data.

15. The data storage device of claim 13, wherein the controller is configured to determine a first number of errors in the data processed by the data block ECC decoder and to compare the first number of errors to a second number of errors that are corrected by the sub-block ECC decoder after processing the first sub-block.

16. The data storage device of claim 13, further comprising a control circuit configured to maintain a count of corrected errors, wherein the count of corrected errors is incremented for each sub-block error that is corrected by the sub-block ECC decoder during processing of the first sub-block.

17. The data storage device of claim 16, wherein the controller is configured to:
compare the count of corrected errors to a first number of errors in the data, wherein the first number of errors is determined after the data is processed by the data block ECC decoder; and
in response to the first number of errors exceeding the count of corrected errors, initiate a next sequential sub-block ECC operation at the sub-block ECC decoder.

18. The data storage device of claim 13, wherein the controller is configured to compare a number of uncorrected errors to an ECC error threshold after the sub-block ECC decoder processes the first sub-block.

19. The data storage device of claim 18, wherein, in response to the number of uncorrected errors in the data block exceeding the ECC error threshold, the controller is configured to initiate a second sub-block ECC operation at the sub-block ECC decoder to process a second sub-block using second sub-block ECC data.

20. The data storage device of claim 18, wherein, in response to the number of uncorrected errors satisfying the ECC error threshold, the controller is configured to initiate a second ECC operation using the main ECC data.

21. The data storage device of claim 13, wherein the memory is a flash memory.

22. The data storage device of claim 21, wherein the data storage device is one of:
a flash memory card;
a universal serial bus (USB) flash drive;
a solid state drive (SSD); and
an embedded flash memory.

23. The data storage device of claim 13, wherein the data storage device is configured to be removably coupled to a host device.

24. The data storage device of claim 13, wherein the data storage device is configured to be coupled to a host device as embedded memory.

25. A method comprising:
in a flash memory device with an error correction coding (ECC) engine, the ECC engine including a data block ECC decoder and a sub-block ECC decoder, performing:
receiving data including a data block and main ECC data for the data block, the data block including a first sub-block of data, first sub-block ECC data corresponding to the first sub-block, a second sub-block of data, and second sub-block ECC data corresponding to the second sub-block, wherein the first sub-block is a subset of the data block and the second sub-block is a different subset of the data block;

initiating a data block ECC operation to process the data block using the main ECC data by providing the data to an input of the data block ECC decoder and instructing the data block ECC decoder to begin processing the data; and in response to the data block ECC operation indicating uncorrectable errors in the data, initiating a first sub-block ECC operation to process the first sub-block using the first sub-block ECC data by providing a portion of the data to an input of the sub-block ECC decoder and instructing the sub-block ECC decoder to begin processing the provided portion of the data.

26. The method of claim 25, wherein a count of corrected errors is incremented during the first sub-block ECC operation for each sub-block error that is corrected.

27. The method of claim 26, further comprising:
comparing the count of corrected errors to a first number of errors in the data, wherein the first number of errors is determined by the data block ECC operation; and in response to the first number of errors exceeding the count of corrected errors, initiating a second data block ECC operation.

28. The method of claim 25, further comprising:
comparing a number of uncorrected errors in the data to an ECC error threshold after processing the first sub-block ECC operation; and in response to the number of uncorrected errors in the data exceeding the ECC error threshold, initiating a second sub-block ECC operation to process the second sub-block using the second sub-block ECC data.

29. The method of claim 25, further comprising:
comparing a number of uncorrected errors in the data to an ECC error threshold after processing the first sub-block ECC operation; and in response to the number of uncorrected errors in the data satisfying the ECC error threshold, initiating a second data block ECC operation using the main ECC data.

\* \* \* \* \*